United States Patent Office 2,783,272
Patented Feb. 26, 1957

2,783,272

PRODUCTION OF FORMAMIDINE SULFINIC ACID

James H. Young, Niagara Falls, N. Y., assignor to E. I. du Pont de Nemours and Company, Wilmington, Del., a corporation of Delaware No Drawing. Application May 8, 1956, Serial No. 583,363

6 Claims. (Cl. 260—500)

This invention relates to an improved method for producing formamidine sulfinic acid, hereinafter referred to as FSA.

Havas U. S. Patent 2,150,921 describes a method for producing FSA involving the addition of 28% aqueous hydrogen peroxide to a 10% solution of thiourea while cooling the reaction mixture. One disadvantage of that method is that recovery of crystalline FSA from the reaction mixture is limited to about 85% of theoretical due to the relatively large amount of water employed. This is because FSA is quite soluble even in cold water, the solubility being about 5% at 0° C. A more serious disadvantage is that the FSA is obtained in the form of needles which are fragile, difficult to dry and take up moisture readily at high humidities. Moist FSA is not stable in storage.

It is an object of the present invention to provide an improved method for producing FSA. A further object is to provide an improved method for reacting hydrogen peroxide and thiourea so as to obtain crystalline FSA in high yield and in a form which is more easily dried, does not take up moisture as readily and is more stable in storage than the needle type product obtained by the above prior method. Still further objects will be apparent from the following description.

The objects of the invention are realized by maintaining an aqueous slurry of FSA crystals at a temperature not exceeding 10° C. and at a pH within the range of 2 to 6 while separately feeding to the slurry solid thiourea and aqueous hydrogen peroxide in such proportions and at such relative rates as will maintain an excess of unreacted thiourea in the slurry during substantially the entire reaction period, which excess, however, will not result in the presence in the liquid phase of the slurry of unreacted thiourea at a concentration in excess of 5% by weight of the liquid phase.

Hydrogen peroxide and thiourea react to produce FSA as follows:

(1) 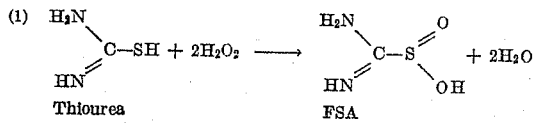

Thiourea     FSA

It has been found that the pH of a 10% solution of thiourea in water is about 6.4 to 6.9 and that at such pH values, FSA is hydrolyzed to urea and sulfoxylic acid as follows:

(2) 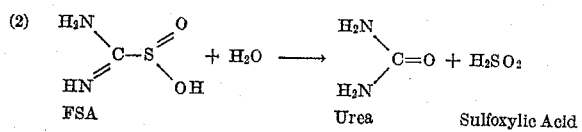

FSA          Urea     Sulfoxylic Acid

Since sulfoxylic acid is a strong reducing agent which reacts rapidly with hydrogen peroxide in the reaction mixture, it is important in carrying out the FSA reaction to avoid the presence in the reaction mixture of sufficient unreacted thiourea to give pH values as high as 6.4. In practice, it has been found that the pH should not exceed 6, and is preferably maintained at a value in the range 3 to 5.

FSA is a weak acid whose aqueous solutions have a pH ranging from about 2 to 4 depending upon concentration. It has been found that at pH values below about 2 thiourea and hydrogen peroxide react to produce a disulfide instead of FSA:

(3) 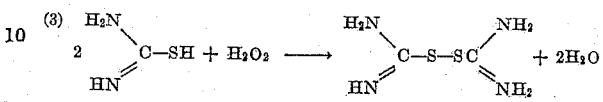

It is, therefore, important that the FSA reaction be carried out in a reaction medium having a pH not lower than 2.

Control of the pH of the reaction medium at a pH within the range 2 to 6, preferably 3 to 5, can be practically accomplished by feeding the reactants separately to the FSA slurry at controlled rates. The reactants should be fed in such manner and at such rates as will provide an excess of unreacted thiourea during substantially the entire reaction period. However, an excess such as will produce a pH above 6 should be avoided, and an excess which will result in a pH of 3 to 5 is preferred. In terms of the amount of dissolved but unreacted thiourea present in the liquid phase of the reaction slurry, the excess of thiourea should correspond to a concentration of unreacted thiourea in the liquid phase of not more than 5% by weight, the preferred concentration ranging from about 0.5 to 1%.

The avoidance of any excess of hydrogen peroxide in the reaction mixture while controlling the excess of thiourea as indicated above is important, not only to the obtainment of high yields of product, but also to the obtainment of the product in the desired crystal form. An excess of hydrogen peroxide, or too great an excess of thiourea, causes the formation of product in the undesired needle form. On the other hand, when the reaction is carried out under the conditions indicated, the product is obtained in the form of blocky crystals from which liquid reaction medium is readily separated by filtration or centrifuging, thus facilitating drying. Moreover, such crystals, when dried, take up moisture from humid atmospheres much less readily than do needle type crystals, and they are more stable under ordinary storage conditions.

As in prior methods, the reaction mixture should be kept during the reaction at a temperature no higher than about 10° C. in order to minimize side reactions. Temperatures of 0 to 10° C. are generally suitable, those of from 0 to 7° C. being preferred.

The FSA reaction is preferably carried out employing solid thiourea and aqueous hydrogen peroxide solution of a strength of at least 35% $H_2O_2$ by weight in order to avoid undue dilution of the reaction mixture with water. The particle size of the thiourea is preferably below 50 mesh in order to facilitate solution thereof in the reaction mixture. Hydrogen peroxide solutions of 50 to 70% strength are most preferred although solutions of up to 90% strength can be used. When employing solid thiourea and peroxide solutions of 50 to 70% strength, product yields of separated crystalline FSA upwards of 90% can be readily obtained.

The invention is illustrated by the following example, in which all parts are parts by weight.

Example

A reaction mixture comprising a slurry of FSA crystals in water was prepared by adding 30 parts of a 50% hydrogen peroxide solution at a rate of 1.2 parts per minute to an agitated solution of 20 parts of thiourea in 300 parts of water maintained at 2 to 5° C. The resulting slurry was then agitated and maintained by cooling at 2 to 5° C. while 120 parts of solid thiourea and 22 parts of 50% hydrogen peroxide solution were added separately thereto. The hydrogen peroxide solution was added continuously at about 1.2 parts per minute. The thiourea was added uniformly over the same period in small increments at such a rate as to maintain the slurry at a pH within the range 3 to 5 and to maintain a concentration of unreacted thiourea in the liquid phase of the slurry of less than 5% by weight and generally within the range 0.5 to 1.0% during substantially the entire reaction period. However, at the end of the reaction, neither thiourea nor hydrogen peroxide was in excess since the total amounts of each represented equivalent proportions.

After separating 161 parts of FSA from the reaction slurry, the residual liquor containing 23 parts of FSA with FSA crystals present was employed as reaction medium in a second preparation carried out as described above and employing 140 parts of thiourea and 252 parts of 50% hydrogen peroxide. The crystalline product (180 parts) separated in the second run corresponded to a yield of about 91% based upon the thiourea and hydrogen peroxide used.

The above product analyzed 96.3% FSA and was in the form of blocky or chunky crystals (generally cube shaped as contrasted with the long needle shaped crystals obtained by prior methods). The crystals were all larger than about 60 mesh standard screen size. They dried readily in a brisk stream of air at temperatures up to about 50 to 60° C. Because of their good purity and large size with relatively low exterior surface area, the crystals did not take up moisture readily from the atmosphere and were stable in storage. A sample of commercial FSA, analyzing 92.6% FSA, was in the form of fragile needle like crystals of smaller size. Such crystals are known to take up moisture readily and to be relatively unstable.

Continuous addition of both reactants to the reaction slurry is preferred since such practice permits optimum control of the desired excess of thiourea. When employing solid thiourea, effective control of the excess thereof can, however, be realized by feeding it in small increments at regular frequent intervals, as illustrated by the above example.

The present method is a practical and convenient way of obtaining FSA in high yield and in a superior crystalline form.

I claim:

1. In a method for producing formamidine sulfinic acid wherein hydrogen peroxide and thiourea are reacted in an aqueous slurry of formamidine sulfinic acid, the improvement comprising maintaining said slurry at a pH within the range 2 to 6 while adding the thiourea and hydrogen peroxide reactants separately to said slurry at such relative rates as will maintain in said slurry during substantially the entire reaction period an excess of thiourea not exceeding a concentration of 5% of unreacted thiourea in the liquid phase of said slurry.

2. The method of claim 1 wherein the excess of thiourea corresponds to a concentration thereof of 0.5 to 1% in the liquid phase of the slurry.

3. The method of claim 2 wherein the pH is maintained within the range 3 to 5.

4. The method of producing formamidine sulfinic acid comprising maintaining an aqueous slurry of formamidine sulfinic acid at 0 to 10° C. and at a pH of 2 to 6 while adding separately thereto solid thiourea and aqueous hydrogen peroxide of 35 to 90% strength, controlling the relative rates of addition of said thiourea and hydrogen peroxide so as to maintain during substantially the entire reaction period an excess of thiourea in said slurry not exceeding a concentration of 5% of unreacted thiourea in the liquid phase of said slurry, then separating product formamidine sulfinic acid crystals from said slurry.

5. The method of claim 4 wherein the excess of thiourea corresponds to a concentration thereof of 0.5 to 1% in the liquid phase of said slurry and the pH of said slurry is maintained at 3 to 5.

6. The method of claim 4 employing aqueous hydrogen peroxide of 50 to 70% strength.

No references cited.